United States Patent [19]

Jorgensen et al.

[11] Patent Number: 4,953,898
[45] Date of Patent: Sep. 4, 1990

[54] MECHANICAL FASTENER FOR PLASTIC CONDUITS

[75] Inventors: Robert W. Jorgensen, Niles, Mich.; Vance W. Young, Jr.; Scott L. Misenar, both of South Bend, Ind.

[73] Assignee: Hubbell Incorporated, Orange, Conn.

[21] Appl. No.: 330,370

[22] Filed: Mar. 29, 1989

[51] Int. Cl.⁵ ............................................. F16L 19/00
[52] U.S. Cl. ................................................... 285/340
[58] Field of Search ........................................... 285/340

[56] References Cited

U.S. PATENT DOCUMENTS

| | | | |
|---|---|---|---|
| 2,458,409 | 1/1949 | Paige | 285/6.5 |
| 2,999,701 | 9/1961 | Blair et al. | 285/340 |
| 3,019,284 | 1/1962 | Matthysse | 285/340 X |
| 4,072,328 | 2/1978 | Elliott | 285/340 X |
| 4,073,514 | 2/1978 | Pate | 285/127 |
| 4,181,329 | 1/1980 | Helm | 285/340 X |
| 4,198,537 | 4/1980 | Mariani | 174/65 R |
| 4,299,363 | 11/1981 | Datschefski | 248/56 |
| 4,324,503 | 4/1982 | Sevrence | 403/197 |
| 4,486,034 | 12/1984 | Sauer | 285/242 |
| 4,575,133 | 3/1986 | Nattel | 285/319 |
| 4,616,105 | 10/1986 | Borsh | 174/65 |
| 4,621,166 | 11/1986 | Neuroth | 174/65 R |
| 4,635,975 | 1/1987 | Campbell | 285/340 |
| 4,655,486 | 4/1987 | Tarnay et al. | 285/340 |
| 4,711,472 | 12/1987 | Schnell | 285/162 |

Primary Examiner—Randolph A. Reese
Assistant Examiner—Carol I. Bordas
Attorney, Agent, or Firm—Jerry M. Presson; Walter C. Farley

[57] ABSTRACT

A connector structure includes a body having a cylindrical recess dimensioned to receive the end of a piece of conduit and a retaining clip to hold the conduit in the recess. The cylindrical recess is provided with an annular recess. The clip comprises a ring with inwardly extending fingers bent out of the plane of the ring, one or more of the fingers having ends thereof bent to form latch tabs. When the conduit is inserted through the clip into the cylindrical recess, the rings are bent against the inner walls of the cylindrical recess so that the tabs enter the annular recess, the intermediate tabe engaging the outer surface of the conduit to hold the assembly together.

4 Claims, 2 Drawing Sheets

4,953,898

MECHANICAL FASTENER FOR PLASTIC CONDUITS

This invention relates to a mechanical device for connecting a piece of plastic conduit to another piece of conduit or to a housing such as a junction box or electrical device box.

BACKGROUND OF THE INVENTION

Various devices have been developed to interconnect a length of either rigid or flexible plastic conduit or electrical non-metallic tubing (ENT), some of which devices have been used commercially. The most common technique requires gluing or otherwise adhering the pieces together using a solvent which, essentially, forms a permanent interconnection. Unfortunately, the adhering process requires the use of a solvent which shows signs of being a potentially hazardous material. Accordingly, a desire in the industry is to find a mechanical alternative which does not present the hazards of such a solvent.

SUMMARY OF THE INVENTION

Accordingly, an object of the invention is to provide a mechanical fastener which is usable to connect rigid plastic conduit or electrical non-metallic tubing to another piece of such conduit or tubing or to the connection hub of a box.

A further object is to provide such a connector which can be made at low cost and which provides a secure grip on the conduit adequate to retain it when subjected to a high-strength pull test.

A still further object is to provide such a connector which allows easy insertion of the conduit into a connector or the like, requires no special preparation of the conduit and can be used in plastic conduit systems without the need for grounding.

Briefly described, the invention includes a connector structure for attaching an end of a length of generally tubular conduit to a body having a cylindrical recess dimensioned to receive the conduit end through an open end of the cylindrical recess including an annular shoulder in the cylindrical recess, the annular shoulder being located in the cylindrical recess a predetermined depth from the open end thereof. A retaining clip having a substantially flat annular ring is dimensioned to abut a surface of the body around the open end of the cylindrical recess substantially coaxially therewith, the annular ring having a central opening dimensioned to receive the conduit. A plurality of fingers extend inwardly from the inner periphery of the ring at an angle of between about 80° and about 45° from a plane containing the ring, at least one of the fingers having a length substantially equal to the predetermined depth at which the annular shoulder is located and having at the distal end thereof an outwardly bent portion forming a locking tab dimensioned to engage the annular shoulder when that finger is flat against the inner surface of the cylindrical recess so that when the ring is placed against the body around the open end of the cylindrical recess with the fingers extending into the recess and when an end of the conduit is inserted through the ring, the fingers frictionally engage the outer surface of the conduit and are bent outwardly so that the locking tab at the distal end of that at least one finger engages the shoulder to inhibit withdrawal of the retaining clip from the cylindrical recess, the fingers inhibiting withdrawal of the conduit therefrom.

BRIEF DESCRIPTION OF THE DRAWINGS

In order to impart full understanding of the manner in which these and other objects are attained in accordance with the invention, particularly advantageous embodiments thereof will be described with reference to the accompanying drawings which form a part of this specification, and wherein.

DESCRIPTION OF THE PREFERRED EMBODIMENTS

Figure 1:
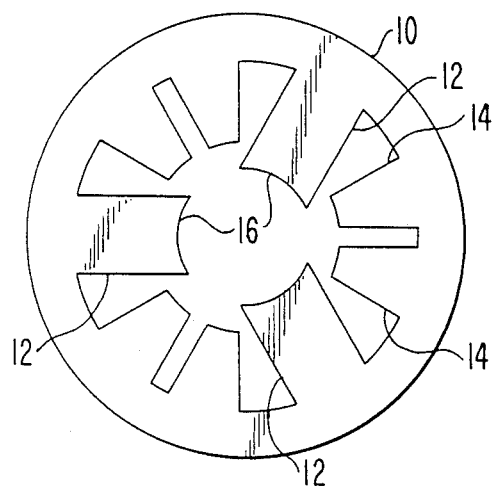
FIG. 1 is a plan view of a retaining clip in accordance with the invention in its flat, undeformed state.
Figure 2:
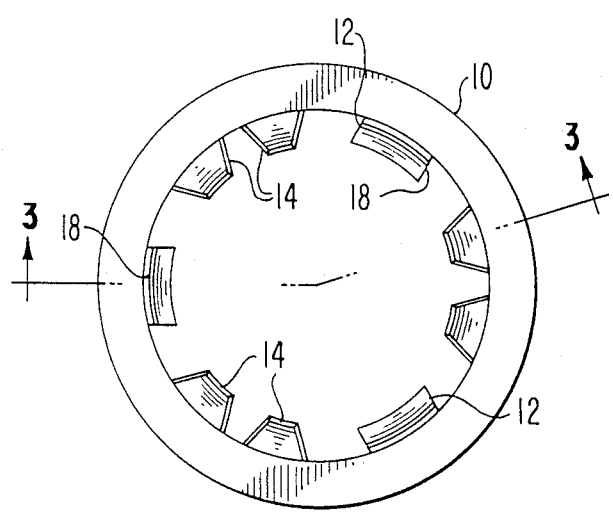
FIG. 2 is a plan view of the clip of FIG. 1 with the fingers thereof bent into a position for use.
Figure 3:
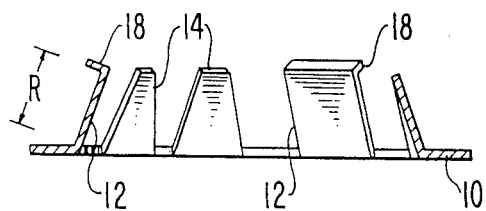
FIG. 3 is a side elevation, in section, along line 3—3 of FIG. 2.

Referring first to FIGS. 1–3, a retaining clip in accordance with the invention which is usable to hold the end of a conduit in a socket or recess dimensioned to receive the conduit includes an annular, continuous ring 10 which is stamped or cut from sheet metal such as spring steel. The clip is formed with a plurality of fingers protruding radially inwardly from the inner periphery of ring 10, the fingers including three relatively long fingers 12 which are uniformly spaced around the interior of ring 10 and a plurality of shorter fingers 14 which are arranged in pairs between adjacent ones of fingers 12. As previously indicated, FIG. 1 shows the retaining clip structure in the form in which it would be found immediately after the central portions thereof have been cut or stamped away to leave the inwardly protruding fingers, the fingers themselves still being in the plane of the ring. Each finger 12, in this form, extends nearly to the center of the circle defining the ring and has an arcuate inner end 16. Fingers 14 extend approximately half way between the inner periphery of ring 10 and the center of the circle defining the ring.

To prepare the stamped clip as shown in FIG. 1 for use, the fingers are bent out of the plane containing ring 10 all in the same direction, i.e., so that they are all lying on the same side of the plane containing ring 10. Each finger is bent to form an angle of between about 10° and about 80° from a plane containing the ring. In addition, the distal ends of fingers 12 are bent so that a small portion of the end of each such finger forms an angle of approximately 90° with the remainder of the finger, each bent end forming a locking tab 18.

Figure 6:
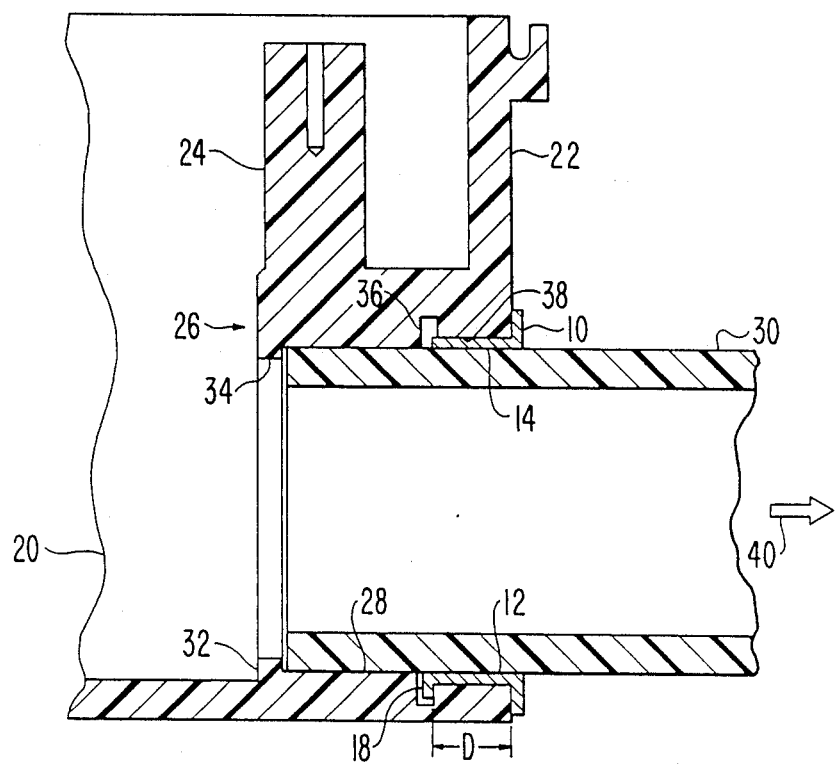
FIG. 6 is a side elevation, in section, of an assembly of a body with a tubular conduit held therein by a retaining clip in accordance with FIGS. 1–3.

FIG. 6 illustrates the retaining clip of FIGS. 1–3 in use. In FIG. 6 an electrical box 20 has a plurality of sidewalls 22, the box having an open front and means 24 to receive fasteners to hold an electrical device, such as a switch or receptacle, in the box. One of the sidewalls is provided with a molded portion 26 extending into box, the molded portion having a cylindrical recess 28 formed therein to receive an end of a section of conduit 30. Recess 28 can be formed with a wall 32 at the inner end thereof, wall 32 having an opening 34 of reduced diameter to form a stop shoulder, limiting the extent of insertion of conduit 30 into the recess. The dimensions of recess 28 and opening 34 can, of course, be varied to accommodate whatever size of conduit is expected to be inserted into the recess. It is desireable, however, for the recess to be dimensioned to rather closely fit the inserted conduit.

The inwardly facing wall of recess 28 is provided with an annular recess 36 which is formed a predetermined distance D inwardly from the outer surface of wall 22 in which the cylindrical recess is formed. It is important that the distance D be approximately equal to the length R of finger 12 between tab 18 and its junction line with the inner periphery of ring 10. The function performed by annular recess 36 can be performed by a shoulder formed so that it faces inwardly, i.e., away from the entry end of cylindrical recess 28. Such a shoulder could be formed by making the inner portion of recess 28 with a larger diameter than the outer portion or mouth thereof, thus forming a step or shoulder at the transition. However, an annular recess is preferred for the tighter fit of the conduit.

As illustrated in FIG. 6, the mouth 38 of recess 28 is preferably formed with a slightly larger diameter than the remainder of the recess to permit fingers 12 and 14 to lie outwardly of the conduit while the remainder of the recess fits the conduit very snuggly. The mouth, in this context, refers to that portion of the recess which lies between annular recess 36 and the outer surrounding surface of wall 22.

In order to assemble the conduit and box, the retaining clip is held adjacent the opening to cylindrical recess 28 with the ring substantially concentric with the recess or, alternatively, the retaining clip is pushed slightly onto the end of conduit 30 and ring 10 is then placed adjacent the surface surrounding the cylindrical recess entrance. The conduit is then pushed into recess 28 until it closely approaches or contacts wall 32. As the conduit is pushed into the cylindrical recess, fingers 12 are bent outwardly until they form a substantially 90° angle with ring 10, whereupon each tab 18 enters recess 36, preventing removal of the retaining clip from recess 28.

Meanwhile, fingers 14 are bent into the cylindrical recess, also forming a substantially 90° angle with ring 10. The distal ends of fingers 14 contact the outer surface of conduit 30 and the edges thereof tend to engage the outer surface of the conduit to the extent of forming a high friction relationship therewith and, preferably, having rather sharp end edges which dig into the material of the conduit, thereby inhibiting removal of the conduit from the retaining clip. Since the clip is held by tabs 18 and the conduit is held by fingers 14, along with the assistance of frictional engagement by fingers 12, the assembly is maintained in a firm, intimate relationship.

As will be recognized from FIG. 6, the length L of each finger 14 and the substantially similar length of each finger 12 after tab 18 has been formed, provides a rather long lever arm against which the conduit can push to cause the fingers to bend outwardly against the inner surface of mouth portion 38 of the cylindrical recess. After insertion, however, the lever arm tending to deform fingers 14 when an extraction force, in the direction of arrow 40 is applied, is very short, amounting only to the difference between the thickness of fingers 14 and the radial spacing between the outer surface of conduit 30 and the inner surface of the mouth portion 38. Thus, insertion of the conduit is very easy but extraction of the conduit is very difficult.

Figure 4:
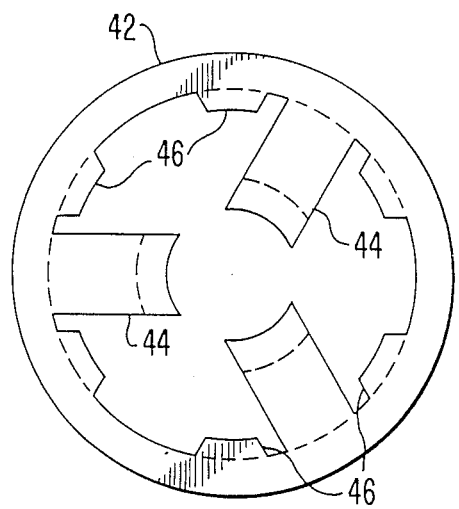
FIG. 4 is a plan view similar to FIG. 1 of a further embodiment of a retaining clip in accordance with the invention.
Figure 5:
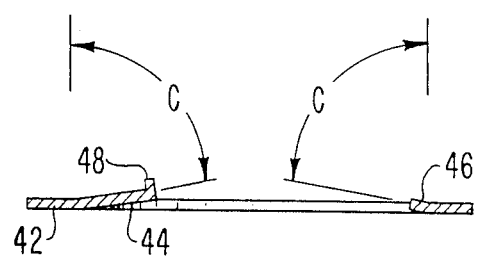
FIG. 5 is a transverse sectional view through the retaining clip of FIG. 4 with the fingers thereof bent into position for use.
Figure 7:
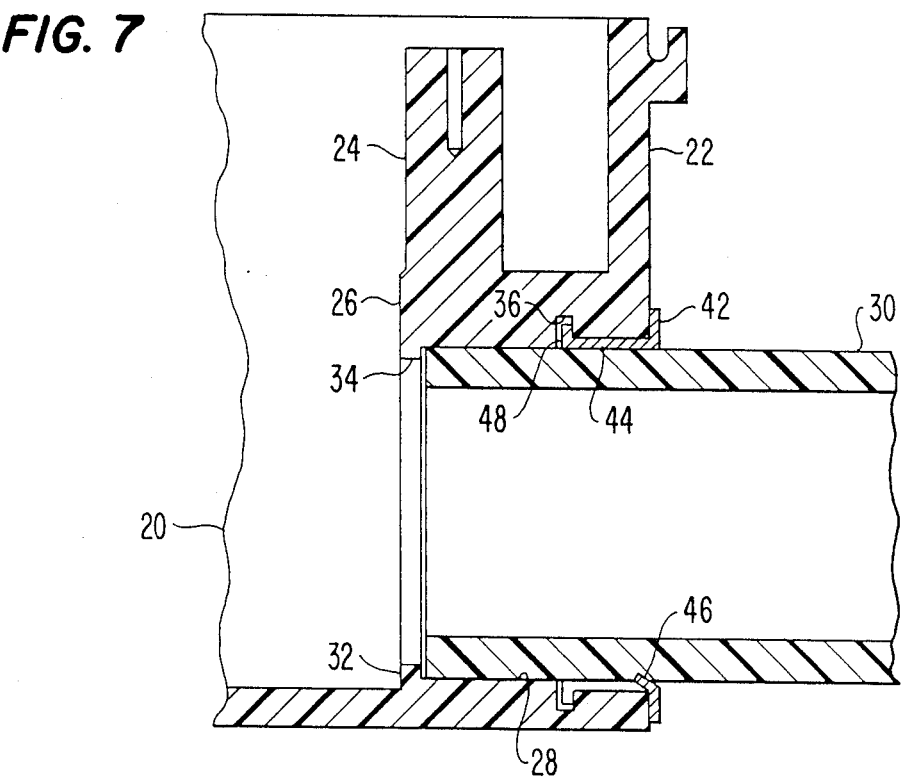
FIG. 7 is a side elevation in section, of a body and conduit joined by a retaining clip in accordance with the embodiment of FIGS. 4 and 5.

A further embodiment of a retaining clip, based on similar principles as that of FIGS. 1-3, is shown in FIGS. 4 and 5 and, in its assembled relationship, in FIGS. 7. As shown in FIG. 4, the retaining clip includes a ring portion 42 with relatively long inwardly extending fingers 44 and rather short inwardly extending fingers 46, the fingers 44 being substantially the same in size and shape as fingers 12 but fingers 46 being somewhat shorter, than fingers 14. Also in the embodiment of FIG. 4, fingers 46 are arranged in pairs on opposite sides of, and closely adjacent to, each finger 44.

In preparation for use, as illustrated in FIG. 5, fingers 44 are bent out of the plane of ring 42 and the distal ends thereof are bent to form latch tabs 48, similar to tabs 18. Fingers 46 are also bent slightly out of the plane of ring 42, the bending angle being between about 10° and about 80° from the plane of ring 42 or, as illustrated at angle C in FIG. 5, between about 80° and about 10° from lines perpendicular to the plane of the ring. The assembly, shown in FIG. 7, again involves insertion into a box 20 which is the same as described in connection with FIG. 6. A conduit 30 is again being inserted into a cylindrical recess 28 in wall 22. As in the case of FIG. 6, fingers 44 are bent to an angle of approximately 90° with respect to ring 42 as conduit 30 is inserted through the retaining clip into the cylindrical recess, latching tabs 48 entering annular recess 36.

Fingers 46, however, being somewhat shorter, tend to present more of an angle at the distal edge thereof to the exterior surface of the conduit 30 and tend to bite more sharply into that outer surface. Thus, although the lever arm, dimensionally, is essentially the same as in FIG. 6, the frictional engagement is greater and therefor inhibits extraction to a greater degree. On the other hand, insertion is slightly more difficult because the length of fingers 46 presents a shorter lever arm to the intruding end of conduit 30.

As will be recognized from the above description, the joining system described above provides a mechanical connection for rigid conduit with a cooperating hub a cylindrical recess. Preferably, the retaining clips are made of a spring steel. The boxes containing the cylindrical recess into which the conduit is to be inserted can be any of the various kinds of boxes commonly in use, including wall boxes, floor boxes, ceiling boxes, weather proof boxes and fittings. In addition, a coupling can be formed using a generally cylindrical body of larger outer diameter than the conduit and cylindrical recesses extending into opposite ends thereof with annular recesses formed as shown in FIGS. 6 and 7 to join two sections of conduit to each other. The clip and assembly relationship is exactly as shown in FIGS. 6 and 7.

The mechanical clip can be applied to any of the electrical products desired, the only requirement being that the product have a hub which is designed to accept the clip. The use of solvents is eliminated and no curing time for any solvent or adhesive is necessary. Additionally, there is no preparation of the conduit required.

While certain advantageous embodiments have been chosen to illustrate the invention, it will be understood those skilled in the art that various changes and modifications can be made therein without departing from the scope of the invention as defined in the appended claims.

What is claimed is:

1. A connector structure for attaching an end of a length of generally tubular conduit to a body having a cylindrical recess dimensioned to receive the conduit end through an open end of said cylindrical recess comprising:

means in said cylindrical recess defining an annular recess and an annular inwardly facing shoulder, said annular, inwardly facing shoulder being located in said cylindrical recess a predetermined depth from the open end thereof; and a retaining clip having a substantially flat annular ring dimensioned to abut a surface of said body around said open end of said cylindrical recess substantially coaxially with said cylindrical recess, said annular ring having a central opening dimensioned to receive said conduit, a first plurality of fingers extending inwardly from the inner periphery of said ring at an angle of between about 10° and about 80° from a plane containing said ring, at least one said finger having a length substantially equal to said predetermined depth which engages said annular shoulder and having at the distal end thereof an outwardly bent portion forming a locking tab dimensioned to engage said annular recess when said finger is flat against the inner surface of said cylindrical recess, and a second plurality of fingers extending from the inner periphery of said ring for engaging said conduit, whereby when said ring is place against said body around said open end of said cylindrical recess with said fingers extending into said cylindrical recess and an end of said conduit is inserted through said ring, said fingers frictionally engage the outer surface of said conduit and are bent outwardly so that said locking tab at the distal end of said at least one finger engages said shoulder to inhibit withdrawal of said retaining clip from said cylindrical recess, said fingers inhibiting withdrawal of said conduit therefrom.

2. A structure according to claim 1 wherein said second plurality of fingers the have distal ends terminating in sharp edges for engaging the outer surface of said conduit.

3. A structure according to claim 2 wherein the fingers of said first plurality of fingers are uniformly spaced around said ring and the fingers of said second plurality of fingers are positioned in equal numbers between the fingers of said first plurality.

4. A structure according to claim 2 wherein said cylindrical recess includes a mouth portion between said open end thereof and said annular recess, said mouth portion having a diameter greater than the diameter of the remainder of said cylindrical recess by an amount equal to twice the thickness of one of said fingers, the diameter of said annular recess being greater than that of said mouth portion.

* * * * *